(12) United States Patent
Galifi et al.

(10) Patent No.: US 9,827,515 B2
(45) Date of Patent: Nov. 28, 2017

(54) CONDUCTIVE FILTER ELEMENT AND FILTER DEVICE HAVING A FILTER ELEMENT

(75) Inventors: Giuseppe Galifi, St. Ingbert (DE); Harald Mees, Lebach (DE)

(73) Assignee: HYDAC FILTERTECHNIK GMBH, Sulzbach/Saar (DE)

( * ) Notice: Subject to any disclaimer, the term of this patent is extended or adjusted under 35 U.S.C. 154(b) by 231 days.

(21) Appl. No.: 13/261,357

(22) PCT Filed: Dec. 8, 2010

(86) PCT No.: PCT/EP2010/007449
§ 371 (c)(1),
(2), (4) Date: Jul. 10, 2012

(87) PCT Pub. No.: WO2011/088869
PCT Pub. Date: Jul. 28, 2011

(65) Prior Publication Data
US 2013/0062271 A1    Mar. 14, 2013

(30) Foreign Application Priority Data

Jan. 23, 2010  (DE) .......................... 10 2010 005 541

(51) Int. Cl.
| B01D 29/00 | (2006.01) |
| B01D 29/11 | (2006.01) |
| B29C 65/00 | (2006.01) |
| B29C 65/16 | (2006.01) |
| B29L 31/14 | (2006.01) |
| B29K 105/16 | (2006.01) |

(52) U.S. Cl.
CPC ..... *B01D 29/0002* (2013.01); *B01D 29/0093* (2013.01); *B01D 29/111* (2013.01);
(Continued)

(58) Field of Classification Search
CPC ................ B01D 29/00; B01D 29/0002; B01D 29/0093; B01D 29/111
(Continued)

(56) References Cited

U.S. PATENT DOCUMENTS 5,130,023 A * 7/1992 Feint ...................... B01D 29/21
                                                  210/493.2
5,798,048 A * 8/1998 Ries ........................ F02M 37/22
                                                  210/243
(Continued)

FOREIGN PATENT DOCUMENTS

| DE | 195 19 481 A1 | 11/1996 |
| DE | 100 58 251 A1 | 8/2001 |

(Continued)

OTHER PUBLICATIONS

Machine Translation of DE 102007013178, cited on ISR.*

*Primary Examiner* — Benjamin Kurtz
(74) *Attorney, Agent, or Firm* — Wenderoth, Lind & Ponack, L.L.P.

(57) ABSTRACT

A filter element (20) includes individual components (2, 4, 8), such as a filter medium (8) as one component and further filter element components (2, 4), of which at least one component (4) is made of a material that is at least partially transparent to laser light and at least one further component (2), in the manner of a barrier layer, is made of a material that is at least partially opaque to laser light to perform a transmission welding method by laser light for connecting associable components to each other. At least some of the components of the filter element that are exposed to the laser light during the transmission welding method are at least partially electrically conductive.

10 Claims, 3 Drawing Sheets

(52) U.S. Cl.
CPC ...... *B29C 65/1635* (2013.01); *B29C 65/1677* (2013.01); *B29C 66/1122* (2013.01); *B29C 66/12441* (2013.01); *B29C 66/5432* (2013.01); *B29C 66/73141* (2013.01); *B01D 2201/50* (2013.01); *B29C 65/168* (2013.01); *B29C 65/1616* (2013.01); *B29C 65/1654* (2013.01); *B29C 66/71* (2013.01); *B29C 66/7392* (2013.01); *B29C 66/8322* (2013.01); *B29K 2105/167* (2013.01); *B29K 2995/0027* (2013.01); *B29L 2031/14* (2013.01)

(58) Field of Classification Search
USPC .................................................. 210/232, 501
See application file for complete search history.

(56) References Cited

U.S. PATENT DOCUMENTS

| | | | |
|---|---|---|---|
| 6,193,833 B1* | 2/2001 | Gizowski et al. | 156/272.8 |
| 9,009,975 B2* | 4/2015 | Walker | B01D 46/50 |
| | | | 210/348 |
| 2003/0111473 A1* | 6/2003 | Carter | F17C 1/06 |
| | | | 220/586 |
| 2004/0245169 A1* | 12/2004 | Breusch | 210/492 |
| 2006/0151378 A1 | 7/2006 | Goll et al. | |
| 2008/0276584 A1* | 11/2008 | Driesen | B01D 29/111 |
| | | | 55/502 |
| 2009/0136717 A1* | 5/2009 | Kihara et al. | 428/174 |

FOREIGN PATENT DOCUMENTS

| | | |
|---|---|---|
| DE | 101 38 073 A1 | 3/2002 |
| DE | 101 01 240 A1 | 7/2002 |
| DE | 10 2007 006004 | 8/2008 |
| DE | 10 2007 013 178 A1 | 9/2008 |
| DE | 10 2008 004 344 A1 | 8/2009 |
| EP | 1 710 007 A1 | 10/2006 |
| WO | WO 2006/056533 A1 | 6/2006 |
| WO | WO 2007/054262 A1 | 5/2007 |
| WO | WO 2008/0142428 * | 11/2008 |
| WO | WO 2009/103556 A1 | 8/2009 |

* cited by examiner

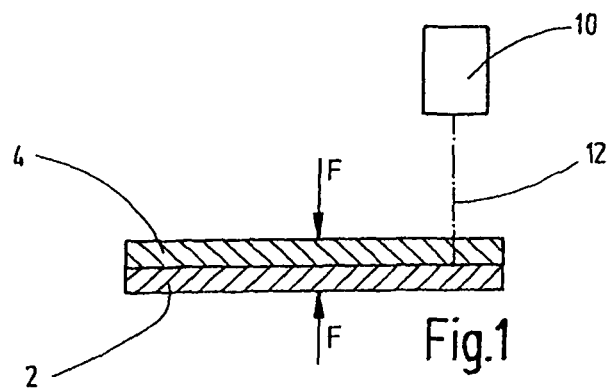
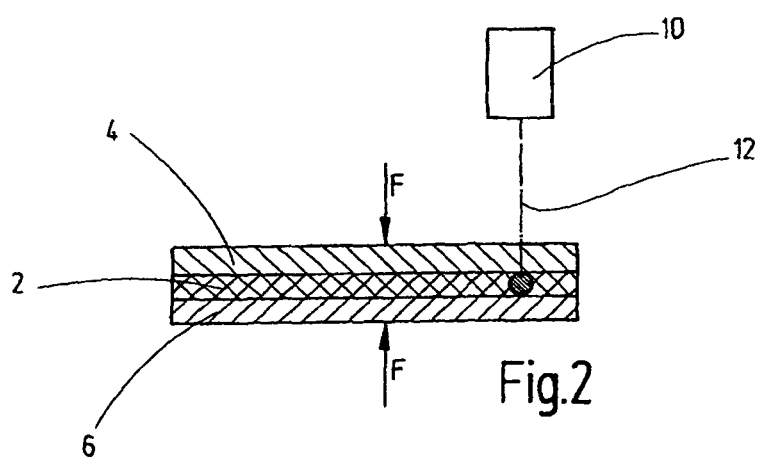
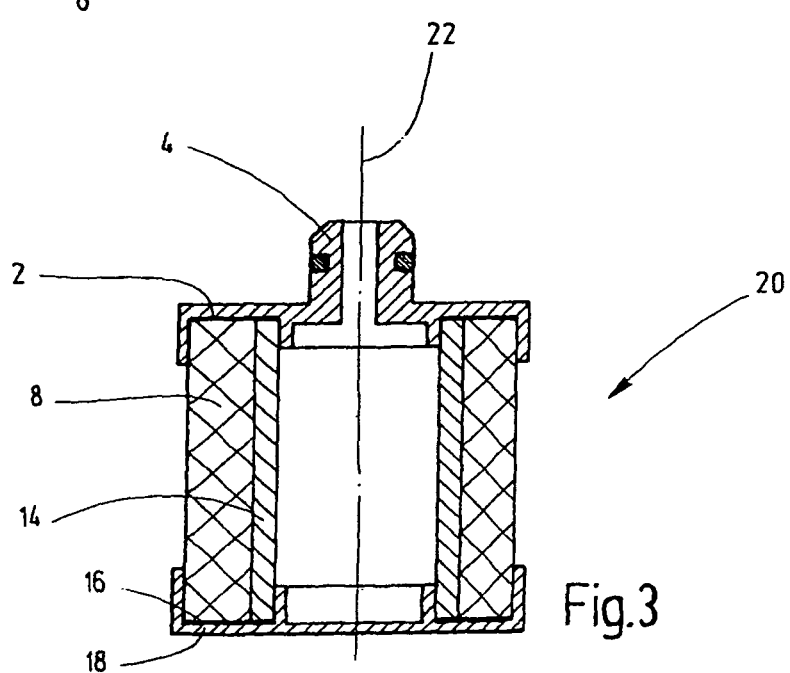

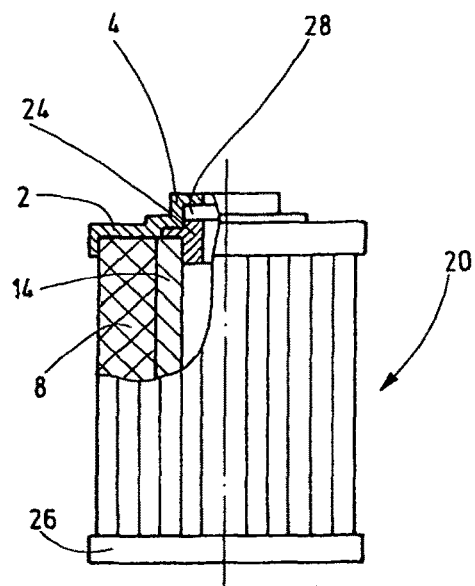
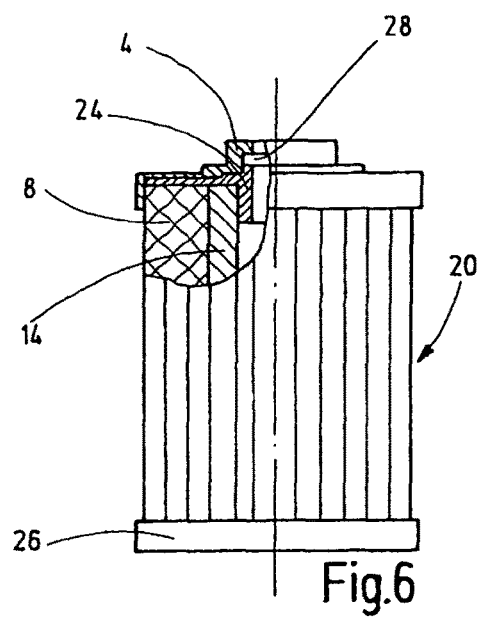
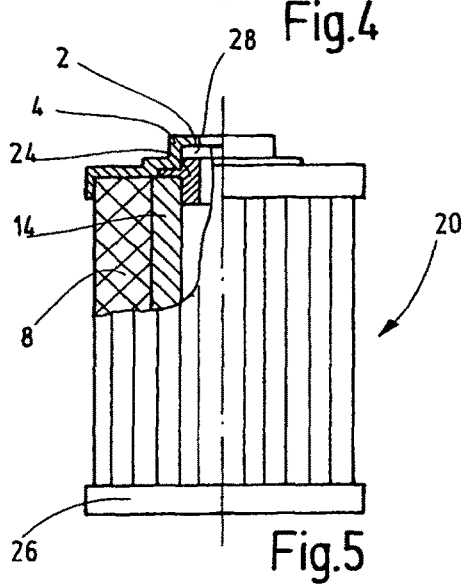
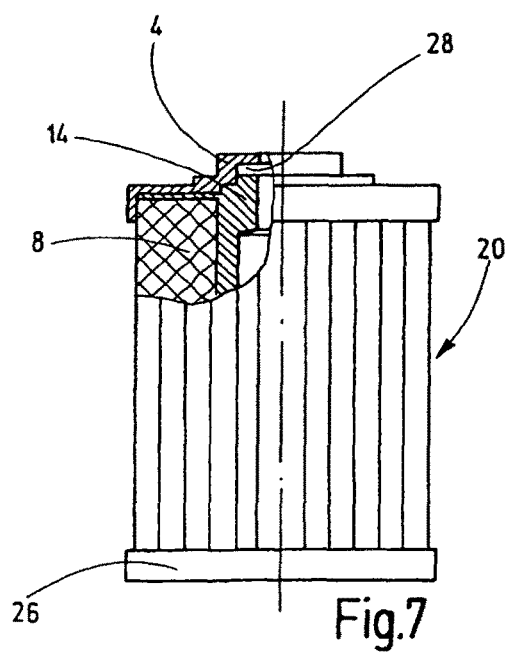
Fig.4
Fig.6
Fig.5
Fig.7

CONDUCTIVE FILTER ELEMENT AND FILTER DEVICE HAVING A FILTER ELEMENT

FIELD OF THE INVENTION

The invention relates to a filter element and a filter device having such a filter element. The filter element comprises individual components, such as a filter medium as the one component and additional filter element components, of which at least one component is made of a material at least partially transmissive to laser light. At least one additional component, designed in the manner of a barrier layer, is made of a material that is at least partially non-transmissive to laser light to carry out a transmission welding process by laser light for the purpose of bonding associable filter element components to each other.

BACKGROUND OF THE INVENTION

Filter elements are used in many fields of engineering for filtration of a wide variety of dissimilar fluids. Some examples of such fluids include hydraulic fluids, lubricants, and fuels. When the fluid flows through a filter medium of the filter element, an electric voltage can be built up. In worst case scenarios, this electric voltage can assume a value that leads to at least a partial destruction of the filter medium or even the filter element. This situation can arise, especially if the charges, generated during the formation of the voltage, cannot be dissipated in a suitable manner from the filter element. To overcome the problem of the generation of the aforementioned voltages, providing the filter medium with a certain conductivity by, for example, introducing conductive wires and inducing a dissipation of the charges accumulating at the filter medium by suitable—usually metallic—additional filter element components are known. Another requirement of such filter elements is the ability to manufacture them at a low cost and in large quantities. To satisfy the latter requirement, bonding together—for example, by adhesively cementing—the individual components of a filter element is expedient. However, the prior art solutions are often cost-intensive and present a significant recycling problem due to the use of a plurality of dissimilar materials.

DE 10 2007 013 178 A1 discloses a method for producing a filter element of the type described above and comprising the steps: providing a filter medium that surrounds an inner filter cavity and contains a heat sealable material; providing at least one end cap that forms a covering of the filter cavity on at least one end, the end cap being made of a laser transmissive thermoplastic material; forming a laser non-transmissive barrier layer between the end cap and the adjacent end of the filter medium; and welding the end cap and the filter medium by irradiating a laser transmissive material adjacent to the barrier layer, with laser energy such that by heating the region adjacent to the barrier layer, a welding volume is made available as a joining element for the welded joint produced by laser transmission welding. To form the barrier layer, a welding film that is non-transmissive to laser light can be inserted between the end cap and the adjacent end of the filter medium.

Since the filter element components are bonded together by laser light in a transmission welding process, an economical production is ensured. The prior art joins the filter elements to each other with an epoxy resin adhesive. However, in contrast to the laser transmission welding method, this method has many drawbacks. For example, this method has a high space requirement for the reaction accumulators, storage areas for the adhesively cemented filter elements, and the adhesive. In addition, this method is very time-consuming, so that the production costs are correspondingly high. The advantages of laser transmission welding lie in the low thermal and mechanical stress on the associable filter element components that are to be bonded together and in the flexibility of laser transmission welding, as well as the possibility of its automation and integration into existing production sequences. With regard to the financial aspect, the expenses incurred for the adhesive and the reaction accumulators are eliminated. In addition, there are no cleaning costs or maintenance costs, as is the case with cementing. Furthermore, the laser transmission welding process has shorter cycle times.

SUMMARY OF THE INVENTION

An object of the present invention is to provide an improved filter element and a filter device having such filter element, so that not only an economical production of the filter element is guaranteed, but that the filter element is ensured to operate reliably. In particular, the buildup of voltages at the components of the filter element that can lead to the destruction of the filter element will be eliminated.

This object is basically achieved by a filter element and by a filter device having at least some of the components of the filter element that are exposed to the laser light during the transmission welding operation at least partially electrically conductive. A reliable dissipation of the charges generated at the filter medium can then be reliably carried out.

In an embodiment of the filter element according to the invention, the barrier layer generates heat due to the absorption of laser light and serves at least partially as a bond relative to adjacent adjoining additional filter element components. The result is that the barrier layer melts either superficially or completely. Due to the heat transfer to the adjacent adjoining additional filter element components, these, too, are melted at least in certain regions and can form a bond with each other or with the barrier layer by welding.

In an embodiment of the filter element according to the invention, the barrier layer is at least partially electrically conductive. Since the barrier layer is designed to be at least partially electrically conductive, charges can be dissipated from the filter element components that are bonded together by the barrier layer.

In an embodiment of the filter element according to the invention, the barrier layer, designed in the manner of a film, is inserted between the filter element components that are to be bonded together by laser light in the transmission welding method. In particular, if films having a thickness of less than 0.2 mm and preferably of about 0.05 mm are used for the barrier layer, then such film will readily adapt to the contours of the filter element components between which the film is inserted and that are to be bonded together.

In an embodiment of the filter element according to the invention, the barrier layer, designed as a coating, is disposed at least in sections on one of the components of the filter element that are to be bonded together. Such coating can be produced, for example, by spraying on. In this embodiment, a barrier layer need not be inserted as a separate part, resulting in a simplified production of the filter element and a cost reduction.

In an embodiment of the filter element according to the invention, the filter medium is at least partially electrically conductive to dissipate charges. As a result, charges generated at the filter medium when a fluid flows through the filter medium can be passed to adjacent and also at least partially electrically conductive filter element components. The generation of voltages that could lead to a destruction of the filter medium is effectively avoided. To this end, a conventional filter medium can be interpenetrated by conductive wires, fibers, or even woven fabrics. The material of the filter medium itself can be designed so as to be at least partially electrically conductive due to suitable additives that are introduced as early as during the manufacture of the filter medium.

In an embodiment of the filter element according to the invention, at least one of the filter element components is made at least in certain regions of an additive in the form of a synthetic plastic material exhibiting carbon nanotubes and/or carbon fibers and/or steel fibers to produce the at least partial electrical conductivity. Such additives have the advantage that they can be readily combined with plastics that are used for manufacturing a filter element or more specifically a filter device. Starting materials that lend themselves well to the addition of such additives include, for example, polystyrene (PS), polyamide (PA), polybutylene terephthalate (PBT), styrene acrylonitrile (SAN), polyether sulfone (PES), acrylonitrile butadiene styrene (ABS), a combination of PC and ABS, a combination of PMMA and ABS, or copolymeric polyacetal (POM). Other additives that have also proven to be successful include carbon fibers.

In an embodiment of the filter element according to the invention, the synthetic plastic material that forms at least one filter element component and is at least partially electrically conductive is at least partially transmissive to laser light.

In an embodiment of the filter element according to the invention, a filter element component forms an end cap providing a covering of the filter element on at least one end and, being made of a material that is at least partially transmissive to laser light. This end cap is exposed to the laser light during the transmission welding process. The end cap forms a covering of the filter element on at least one end of the filter element and an enclosure for the filter medium on its face side.

In an embodiment of the filter element according to the invention, the end cap is at least partially electrically conductive. As a covering of the filter element, the end cap can be made as one part or as multiple parts—in particular, as one, two, or three parts, with at least one of the parts of the end cap in this embodiment being designed to be at least partially electrically conductive so that the charges dissipated from the filter medium can be passed as far as to the outer covering of the filter element. In addition, at least parts of that end cap can exhibit connecting mechanisms that serve to feed in fluids that are to be cleaned or to remove fluids that have been cleaned. In a preferred embodiment, such connecting mechanisms also have at least one receiving space for a sealant. In particular, the receiving space can be provided in the form of a recess for an O-ring.

In an embodiment of the filter element according to the invention, at least one of the filter element components is made at least in certain regions of a synthetic plastic material, having an additive in the form of glass fibers, for the purpose of forming the material that is at least partially non-transmissive to laser light. Just a small amount of glass fibers admixed to the synthetic plastic material causes a decrease in the transmission of laser light through such a material and an increase in the absorption of the laser light. When the synthetic plastic material is prepared in such way, the energy of the laser light is converted preferably into heat.

Lasers that lend themselves well to the transmission welding process with laser light include, for example, solid state lasers such as Nd:YAG lasers with a wavelength of 1,064 nm and high power diode lasers with wavelengths in the range of 800 to 1,000 nm.

In an embodiment of the filter device according to the invention, this filter device comprises an inventive filter element and at least one element receptacle that is at least partially electrically conductive. The element receptacle can be connected in a fluid-tight manner to at least one filter element component of the filter element and can be connected in an electrically conductive manner to at least one filter component of the filter element. Due to the electrically conductive connection between the element receptacle of the filter device and the filter element, the charges to be dissipated from the filter element can be dissipated by way of the element receptacle and, thus, from the filter device.

Other objects, advantages and salient features of the present invention will become apparent from the following detailed description, which, taken in conjunction with the annexed drawings, discloses preferred embodiments of the present invention.

BRIEF DESCRIPTION OF THE DRAWINGS

Referring to the drawings which form a part of this disclosure:

FIG. 1 is a highly simplified, schematic side elevational view in section illustrating the transmission welding process by laser light according to an exemplary embodiment of the invention;

FIG. 2 is an additional, highly simplified, schematic side elevational view in section of explaining the method by which the transmission welding process by laser light is carried out according to an exemplary embodiment for the invention;

FIG. 3 is a side elevational view in section of a filter element according to a first exemplary embodiment of the invention;

FIG. 4 is a side elevational view partially in section of a filter element according to a second exemplary embodiment of the invention;

FIG. 5 is a side elevational view partially in section of a filter element according to a third exemplary embodiment of the invention;

FIG. 6 is a side elevational view partially in section of a filter element according to a fourth exemplary embodiment of the invention;

FIG. 7 is a side elevational view partially in section of a filter element according to a fifth exemplary embodiment of the invention;

DETAILED DESCRIPTION OF THE DRAWINGS

Figure 8:
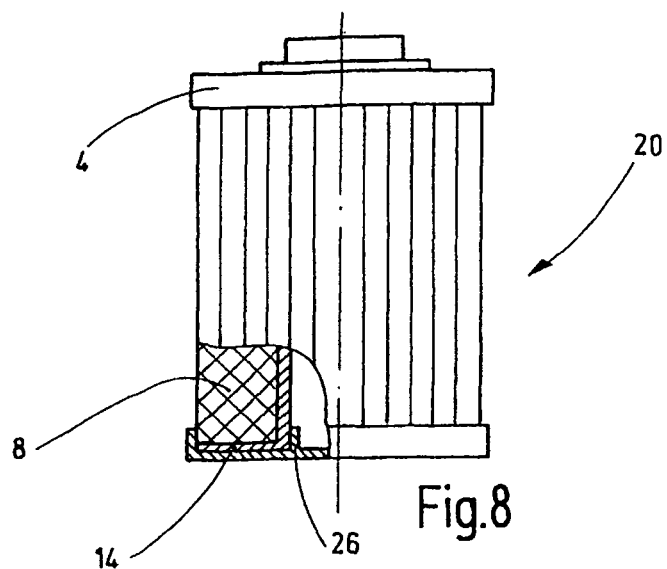
FIG. 8 is a side elevational view partially in section of a filter element according to a sixth exemplary embodiment of the invention.

FIG. 1 shows that in the course of the transmission welding process by laser light, the laser light 12 of a laser light source 10 penetrates a component 4 that is at least partially transmissive to laser light, before the laser light 12 impinges on a component 2 that is at least partially non-transmissive to laser light. Owing to the absorption of the laser light 12 at the surface of the component 2, heat is generated at the surface of the component so that the surface in the region under treatment begins to melt, with the thermal energy also being passed, according to the drawing in FIG. 1, to the underside of the component 4. A desired welded joint of the two components is produced by a predefined joining pressure F when the melt of the component 2 and the component 4 solidifies.

The component 2 that is at least partially non-transmissive to laser light can be, for example, a plate, a disk, or a film that melts either superficially or completely during the welding process. In the drawing of FIG. 1, the component 2 is designed in the form of a plate. In the drawing of FIG. 2, the component 2 is designed in the form of a film and is completely melted during the transmission welding operation to join together two components 6 and 4. In so far as the components 2, 4 and 6 are designed to be at least partially electrically conductive, an electrical charge can be dissipated from the component 4 to the component 2 and/or to the component 6 and/or vice versa.

A laser light-transmissive and simultaneously electrically conductive synthetic plastic material can be made, for example, by additives in the form of a specified quantity of carbon nanotubes (CNTs) and/or carbon fibers in the base material of the synthetic plastic material. The additives produce a sufficiently electrical conductivity. The material is transparent to the laser in a specific laser wavelength range.

FIG. 3 is a longitudinal view of an exemplary embodiment of an inventive filter element 20 designed to be in essence rotationally symmetrical to a central axis 22. Filter element 20 comprises individual components, such as a filter medium 8 as the one component and additional filter element components 2, 4, 14, 16, and 18. To carry out a transmission welding operation with laser light 12 for the purpose of bonding associable filter element components to each other, at least one component 4 is made of a material that is at least partially transmissive to laser light 12 and at least an additional component 2 designed in the manner of a barrier layer and made of a material that is at least partially non-transmissive to laser light 12. In this case, some of the components of the filter element that are exposed to the laser light 12 during the transmission welding process are at least partially electrically conductive. For example, in the embodiment depicted in FIG. 3, the component 4 of the filter element 20 is designed to be at least partially electrically conductive. The barrier layer 2 generates heat due to the absorption of laser light and, as a result, serves at least partially as a bond relative to adjacent adjoining additional filter element components, such as the component 4, the filter medium 8, and a support tube 14. The lower end (as viewed in FIG. 3) of the filter element 20 has an additional component 16, which additional component is non-transmissive to laser light. This additional component is disposed in the form of an additional barrier 16 between the support tube 14, the filter medium 8, and a lower covering 18. As a result, associated filter element components can also be bonded together in this region.

In an embodiment of the filter element 20 according to the invention, the barrier layer 2 and/or 16 is at least partially electrically conductive. This barrier layer then lends itself well to the transport of charges.

FIGS. 4 and 5 show in each case a partially cut view of additional exemplary embodiments of the conductive filter element 20 according to the invention. This filter element is structurally designed such that an electrical conductivity is provided and that joints can be made by the transmission welding method with laser light. In the embodiments depicted herein, synthetic plastic materials are used for the components that do not have to be simultaneously conductive and transparent to laser light.

According to FIG. 4, an electrically conductive absorbing barrier layer 2 is laid as an additional piece between a laser-transparent end cap, filter medium 8, and support tube 14. The end cap 4 is constructed as two parts and has an inner ring 24, which is made of an electrically conductive synthetic plastic material that can dissipate the electrical charge to a conducting connecting piece 40 (see FIG. 10) of an element receptacle 42 (see FIG. 10). The inner ring 24, the barrier layer 2, the support tube 14, and the filter medium 8 are made of an electrically conductive synthetic plastic material. In the interest of cost savings, the lower end cap 26 (as viewed in FIG. 4) can be made of a non-electrically conductive synthetic plastic material, but must be transparent to the laser. In this case, the barrier layer 2 is designed in the manner of a film.

According to the exemplary embodiment from FIG. 5, a three part, preferably injection-molded, O-ring cap is used for the laser light-transmissive component 4. The O-ring cap is constructed with a barrier layer 2 that is sprayed on in the 2-component injection molding process or is inserted as a separate part. The inner ring 24 forms the third part of the O-ring cap. As a result of inserting the inner ring 24 into the O-ring cap, a receiving space 28 is produced for an O-ring. The charge generated at the filter medium 8 is dissipated from the filter medium 8 to the support tube 14 by the inner ring 24 on the conducting element connecting piece 40 of the element receptacle 42 (see FIG. 10). Therefore, the components 2, 24, 14, and 8 are made of an electrically conductive synthetic plastic material. The upper component 4 (as viewed in FIG. 5) of the O-ring cap is made of a laser-transparent synthetic plastic material, so that the laser light 12 can pass to the component 2 of the filter element that is non-transmissive to laser light.

In the exemplary embodiment according to FIG. 6, the inner ring 24 is inserted into the component 4 of the O-ring cap that is transmissive to laser light. The component 2 that is non-transmissive to laser light is attached here to the inner ring 24. During the welding process, the laser penetrates through the component 4 that is transmissive to laser light and melts the barrier layer as the component that is non-transmissive to laser light as a part of the inner ring 24. The resulting thermal energy melts the surface of the laser light-transmissive component 4 in the form of the O-ring cap, the support tube 14, and the filter medium 8. During the solidification of the melt bath, a welded joint is formed between the components. In this configuration of the components, the O-ring cap is designed to be laser-transparent, whereas the inner ring 24 is designed to be laser-absorbing. The electrical charge is passed from the filter medium 8 over the support tube 14 to the inner ring 24, with these components being made of an electrically conductive synthetic plastic material. The lower end cap 26 has to be designed to be laser-transparent, but not necessarily electrically conductive.

In the additional embodiment from FIG. 7, the inner ring 24 is eliminated, because in this case the support tube 14 is inserted into the component 4 that is transmissive to laser light, so that the receiving space 28 is formed for an O-ring. A component that is non-transmissive to laser light is sprayed in the form of a barrier layer onto the support tube 14. The filter medium 8 and the support tube 14 are made of an electrically conductive material. The electrical charge is dissipated from the support tube 14 to the conducting connecting piece 40 of the element receptacle 42 (see FIG.

Figure 10:
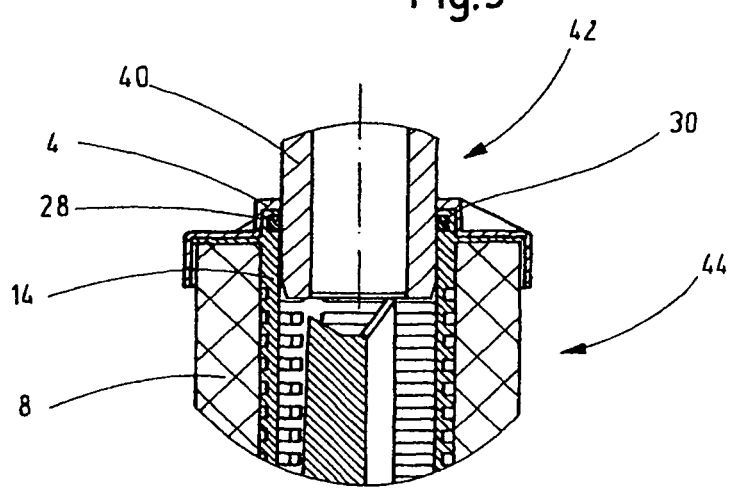
FIG. 10 is a partial side elevational view in section of an element receptacle of a filter device according to a second exemplary embodiment of the invention.

9, FIG. 10). The O-ring cap, as the component 4 that is transmissive to laser light, and the lower end cap 26 disposed at the opposite face-side end of the filter medium 8 are made of a material that is transmissive to laser light. Since the barrier layer is sprayed onto the support tube 14 by injection molding, no need exists to additionally insert a barrier layer as a separate part. As a result, the design of the filter element 20 according to the drawing in FIG. 7 has proved to be especially economical.

Even in the embodiment according to FIG. 8, the barrier layer is sprayed, as in FIG. 7, onto the support tube 14, that no need exists to insert a separate part as the barrier layer that is non-transmissive to laser light. The laser beam penetrates the lower end cap 26 that is transmissive to laser light, and melts the barrier layer. Then, this barrier layer bonds the lower end cap 26 to the support tube 14 and the filter medium 8. The electrical charge is passed from the filter medium 8 to the support tube 14. The filter medium 8 and the support tube 14 are made of an electrically conductive synthetic plastic material.

The variants that are depicted in the various exemplary embodiments and that are intended for connecting the O-ring cap as the component 4 transmissive to laser light and/or for connecting the lower end cap 26 can also be combined. For this purpose, the variants can also be applied to a filter element 20 with an external support tube (not illustrated). Optionally, the support tube in the variants can also be constructed as two parts to ensure the installation of the filter medium 8. To this end, an especially expedient design forms the support tube as two parts in the axial direction. From the viewpoint of cost-effectiveness, a combination of the embodiment from FIG. 7 with the embodiment from FIG. 8 with a barrier layer that is sprayed directly onto the support tube is especially interesting.

Figure 9:
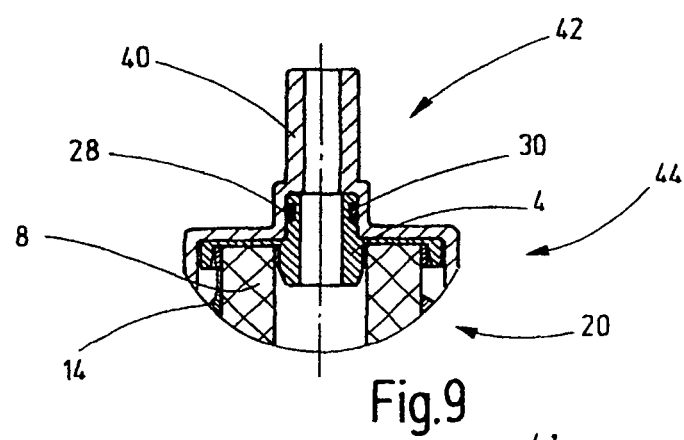
FIG. 9 is a partial side elevational view in section of an element receptacle of a filter device according to a first exemplary embodiment of the invention.

FIGS. 9 and 10 show the element receptacles 42 for the filter devices 44 according to the invention. In each case, the element receptacle has a conducting connecting piece 40 that can be connected in a conducting manner to a component of the filter element 20 according to the invention.

In the embodiment according to FIG. 9, the filter medium 8 of the filter element 20 is disposed in a support tube 14. The O-ring cap 4 has a receiving space 28 into which an O-ring 30 is inserted on the outer circumferential side in the direction of the conducting connecting piece 40 of the element receptacle 42. As a result, the O-ring cap 4, designed in the form of a hollow connecting piece in the region of the O-ring, is brought into sealing contact with a corresponding recess of the conducting connecting piece 40. At the same time, a charge transport from the O-ring cap 4 to the conducting connecting piece 40 of the element receptacle 42 can take place.

In the embodiment according to FIG. 10, the filter medium 8 is mounted on a support tube 14 that lies coaxially on the inside. The support tube 14 has in turn on its end, adjacent to the connecting piece 40, a receiving space 28 for an O-ring 30. In contrast to the exemplary embodiment according to FIG. 9, the connecting piece 40 of the element receptacle 42 is not attached here externally to the O-ring cap 4, but rather penetrates the O-ring cap 4 to rest against the inner wall of the support tube 14 in sealing contact with the O-ring 30.

While various embodiments have been chosen to illustrate the invention, it will be understood by those skilled in the art that various changes and modifications can be made therein without departing from the scope of the invention as defined in the appended claims.

What is claimed is:

1. A filter element, comprising:
   a filter medium component made of synthetic plastic material;
   a support tube component made of synthetic plastic material adjacent said filter medium component;
   a first end cap component overlying a first end of said filter medium component and a first end of said support tube component, said first end cap component including an outer part and an inner ring, said outer part being separately formed from said inner ring and being formed exclusively of non-electrically conductive material, said inner ring being made of electrically conductive synthetic plastic material and being connectable to a connecting piece of an element receptacle to dissipate an electric charge; and
   a first barrier layer extending between or among all of said components and being made of a material at least partially electrically conductive and nontransmissive to laser light to carry out a transmission welding process by laser light bonding together at least some of said components exposed to laser light, said synthetic plastic material of each of said components having additives of at least one of carbon nanotubes, carbon fibers or steel fibers producing at least partial electrical conductivity, and being at least partially transmissive to laser light.

2. A filter element according to claim 1 wherein said barrier layer can generate heat due to absorbing laser light and at least partially forms a bond between the respective components that are adjacent to one another.

3. A filter element according to claim 1 wherein said barrier layer comprises a film.

4. A filter element according to claim 1 wherein said barrier layer comprises a coating disposed on at least sections of one of said components.

5. A filter element according to claim 1 wherein said synthetic plastic material of each of said components has an additive of glass fibers to be at least partially non-transmissive to laser light.

6. A filter element according to claim 1 wherein
   a second end cap component overlies a second end of said filter medium and said second end of said support tube opposite said first ends of said filter medium and said support tube and is made of a synthetic plastic material with at least one of the additives; and
   a second barrier layer is made of a material at least partially electrically conductive and non-transmissive to laser light to carry out a transmissive welding process by laser light welding together said second end cap component, said filter medium component and said support tube component.

7. A filter device, comprising:
   a filter element including
      a filter medium component made of at least partially transmissive to laser light synthetic plastic material;
      a support tube component made of at least partially transmissive to laser light synthetic plastic material adjacent said filter medium component;
      an end cap component made of at least partially transmissive to laser light synthetic plastic material overlying said filter medium component and said support tube component; and
      a barrier layer being made of a material at least partially electrically conductive and non-transmissive to laser light to carry out a transmission welding process by laser light extending between and bonding together all of said components, said synthetic plastic material of each of said components having additives of at least one of carbon nanotubes, carbon fibers and steel fibers producing at least partial electrical conductivity, said end cap component including an outer part and an inner ring, said outer part being separately formed from said inner ring and being formed exclusively of non-electrically conductive material, said inner ring being made of a synthetic plastic material with at least one of the additives and being connected to a connecting piece of an element receptacle to dissipate an electrical charge; and at least one element receptacle being at least partially electrically conductive and being connected fluid tight and electrically connected to at least one of said components of said filter element.

8. A filter device according to claim 7 wherein said end cap component comprises an injection-molded O-ring cap having first, second and third parts and having said barrier layer one of sprayed thereon in a two-component injection-molding process or inserted therein as a separate part, said third part being said inner ring, said inner ring being inserted into said first and second parts of said O-ring cap and producing a receiving space for an O-ring.

9. A filter device according to claim 7 wherein said end cap component comprises an O-ring cap.

10. A filter element, comprising:

a filter medium being made of synthetic plastic material at least partially transmissive to laser light;

an end cap being made of synthetic plastic material at least partially transmissive to laser light; and a barrier layer extending between said filter medium and said end cap and being made of a material at least partially electrically conductive and non-transmissive to laser light to carry out a transmission welding process by laser light bonding together said filter medium and said end cap, said synthetic plastic material of each of said filter medium and said end cap having additives of at least one of carbon nanotubes, carbon fibers and steel fibers producing at least partial electrical conductivity, said end cap including an outer part and an inner ring, said outer part being separately formed from said inner ring and being formed exclusively of non-electrically conductive material, said inner ring being made of a synthetic plastic material with at least one of the additives and being connectable to a connecting piece of an element receptacle to dissipate an electrical charge.

* * * * *